United States Patent [19]
Anderson

[11] Patent Number: 5,286,152
[45] Date of Patent: Feb. 15, 1994

[54] RIVET FASTENER WITH PUSH-IN RELEASABLE DRIVE PIN

[75] Inventor: Laura A. Anderson, Elk Grove Village, Ill.

[73] Assignee: Illinois Tool Works Inc., Glenview, Ill.

[21] Appl. No.: 986,974

[22] Filed: Dec. 8, 1992

[51] Int. Cl.⁵ .............................................. F16B 13/06
[52] U.S. Cl. ........................................... 411/45; 411/41
[58] Field of Search .................. 411/41, 48, 49, 15, 411/45, 43, 508, 44, 57

[56]    References Cited
U.S. PATENT DOCUMENTS

| | | | |
|---|---|---|---|
| 3,202,038 | 8/1965 | Bass | 411/57 |
| 3,918,130 | 11/1975 | Poe | 411/41 X |
| 4,083,289 | 4/1978 | Erickson | 411/43 X |
| 4,085,651 | 4/1978 | Koscik | 411/43 |
| 4,571,134 | 2/1986 | Beglinger et al. | 411/41 |
| 4,637,765 | 1/1987 | Omata | 411/41 |
| 4,840,523 | 6/1989 | Oshida | 411/48 |
| 5,085,545 | 2/1992 | Takahashi | 411/45 |

*Primary Examiner*—Rodney M. Lindsey
*Attorney, Agent, or Firm*—Schwartz & Weinrieb

[57]    ABSTRACT

A rivet fastener which can be readily and repeatedly removed and reinstalled including a rivet body and a drive pin where the drive pin can be inserted within the rivet body so as to retain the fastener within an article and upon further insertion of the drive pin the fastener is released from an article where the drive pin does not protrude from the back side of the rivet body either during fastening or removal thereof.

17 Claims, 2 Drawing Sheets

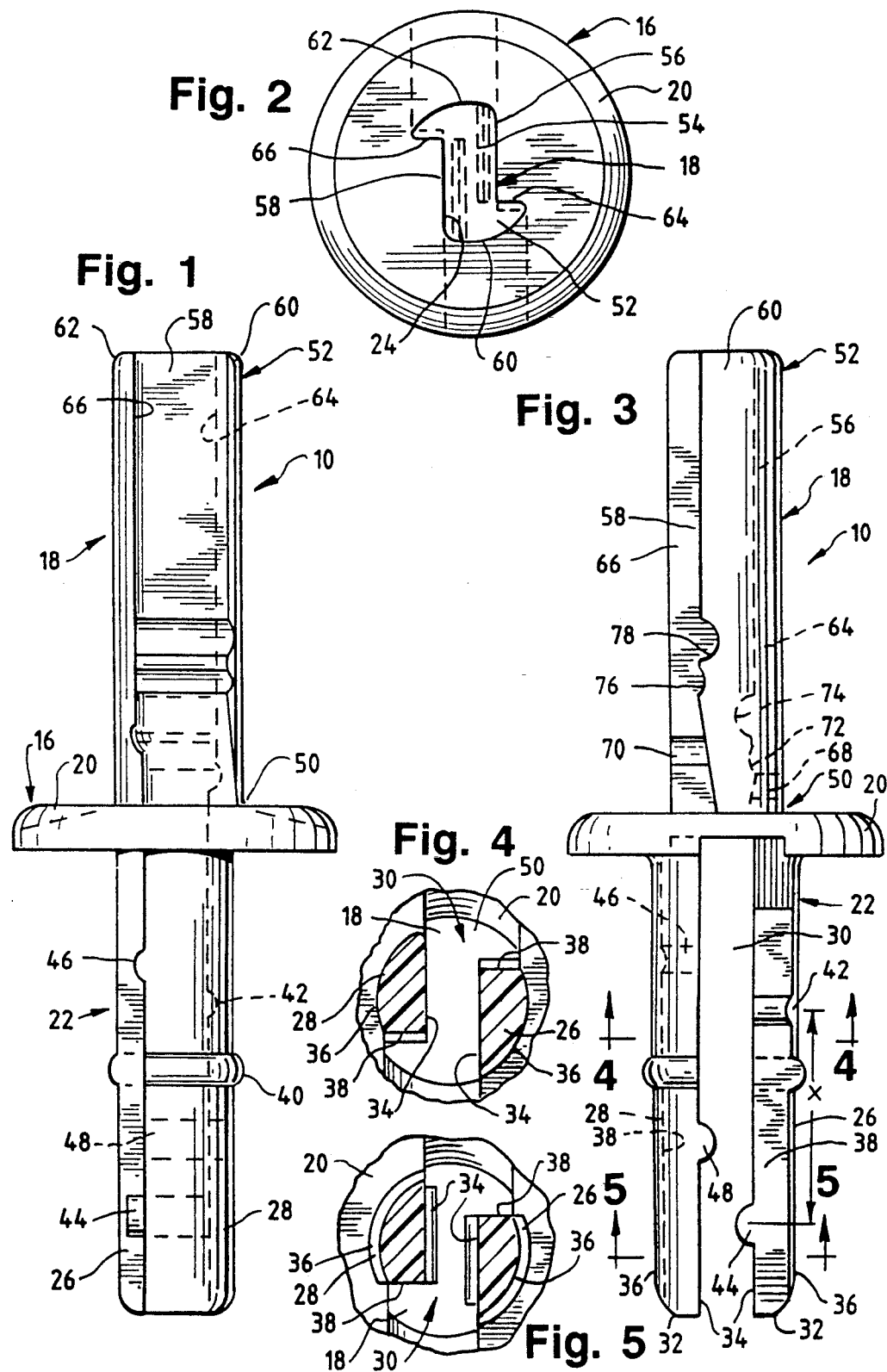

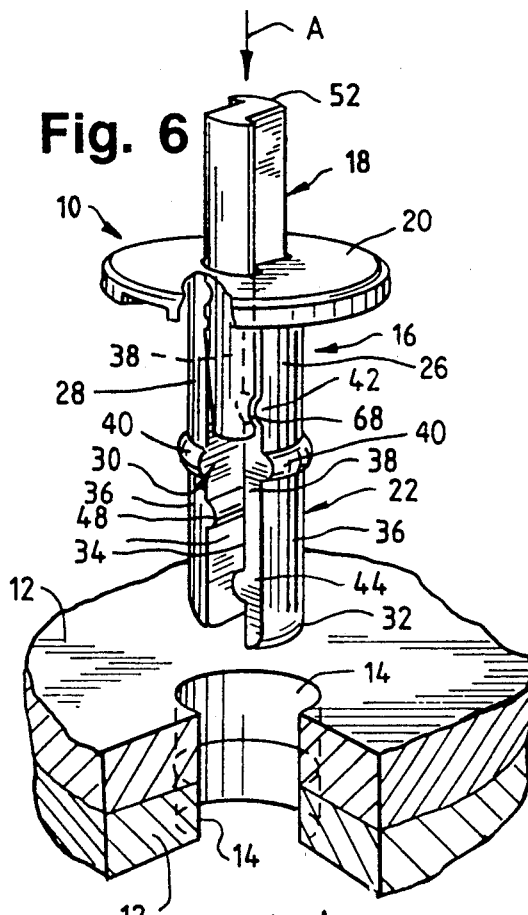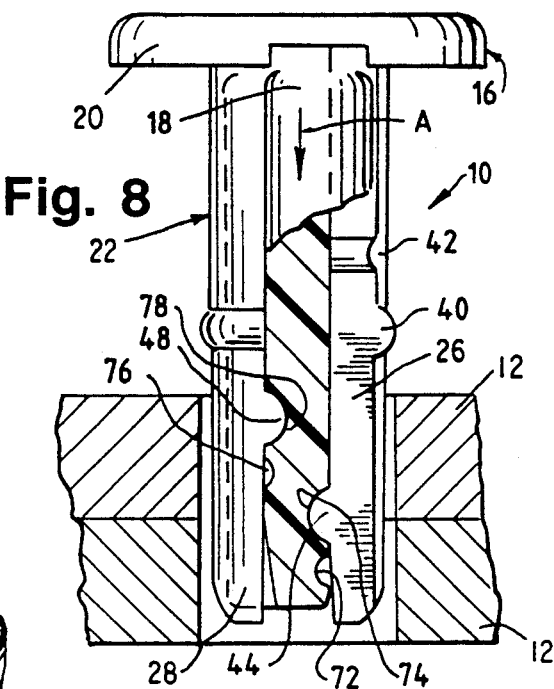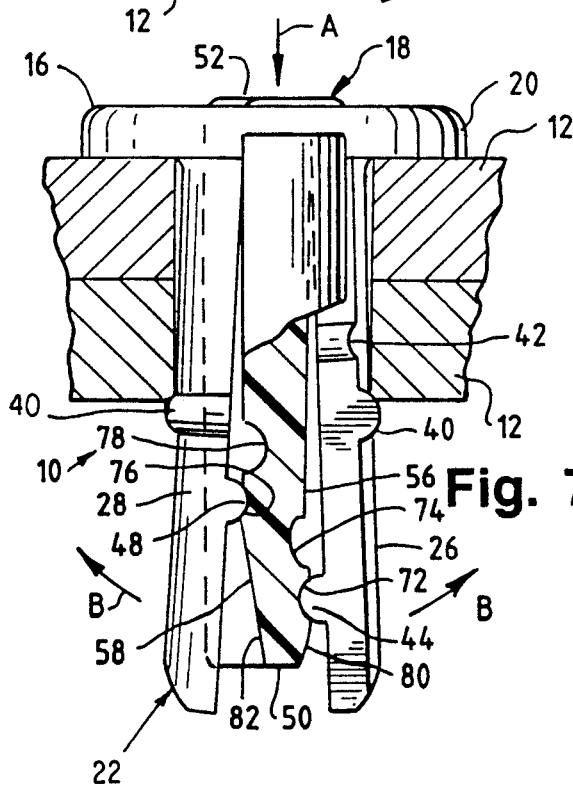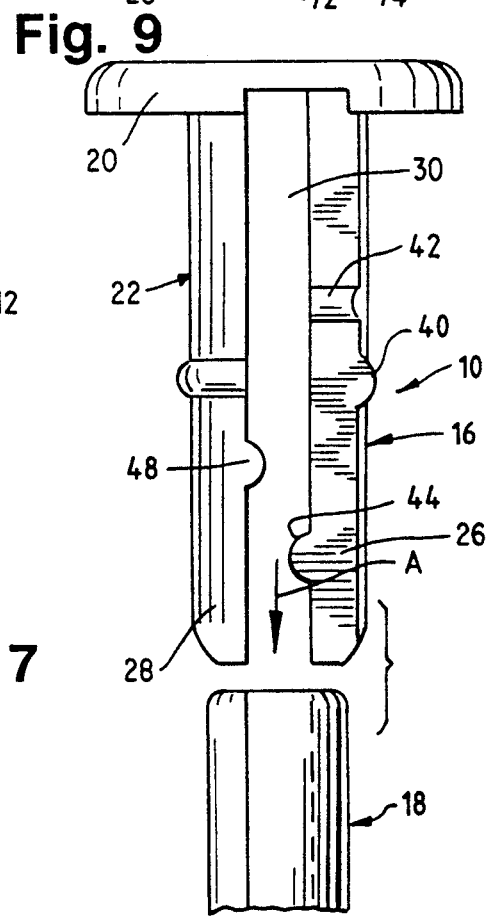

RIVET FASTENER WITH PUSH-IN RELEASABLE DRIVE PIN

BACKGROUND OF THE INVENTION

1. Field of the Invention

This invention relates generally to rivet fasteners, and more particularly, to a front mounted rivet fastener which can readily and repeatedly be removed and reinstalled and includes a drive pin which can be inserted and which retained within a shank of a rivet body at a pre-driven position, inserted past the pre-driven position so as to be retained at a driven position which retains the fastener within an article and which can be inserted further past the driven position so as to be retained at a release position which disengages the fastener from the article, wherein the drive pin does not protrude from the rivet body when positioned at the pre-driven, driven or release positions.

2. Description of the Related Art

Rivet fasteners are typically utilized to secure two members together, such as two panels or the like, and include a rivet body and a corresponding drive pin. The rivet body includes a head portion and a shank portion and an axial bore extending therethrough. After the shank portion is inserted through aligned apertures formed in the members which are to be connected, the drive pin is inserted through the axial bore so as to contact and outwardly expand the shank portion behind the members and provide the desired fastening.

One type of rivet fastener is known as a "push-push" or "double-push" rivet fastener, an example of which is illustrated in U.S. Pat. No. 4,637,765. That patent discloses a push-push type fastener having only one expandable leg which can retain the drive pin to the rivet body in a pre-driven position prior to installation. Removal of this fastener after installation is provided by pushing the drive pin further into the rivet body beyond the fastened position. At that point, the leg can be compressed and the rivet body released from engagement within the aperture of a panel. A head is provided on the drive pin to prevent the drive pin from coming all the way out of the rivet body when pushed therethrough.

When such a rivet is fastened, however, the distal end of the drive pin protrudes from the back side or shank of the rivet body. Additionally, when the drive pin is pushed further into the body to remove the fastener, the drive pin protrudes even further from the shank of the rivet body. Thus, in use, additional clearance space must be provided behind the shank of the fastener in order to accommodate the portion of the drive pin which protrudes beyond the shank when fastened and released. In most applications, such additional clearance space is simply not available.

It therefore is desirable to provide a push-push type rivet fastener which can readily and repeatedly be removed and reinstalled, which includes a drive pin and a rivet body, and which does not require additional space beyond the shank of the rivet body to accommodate the drive pin when pre-driven, driven or removed.

SUMMARY OF THE INVENTION

The invention provides a rivet fastener for front mounting to an article, such as a panel or to retain two panels together, and includes a rivet body and a drive pin. The rivet body includes a head member and a shank member which is integrally formed with a first back side of the head member and the head member includes an aperture therethrough having a predetermined configuration. The shank member extends a predetermined distance away from the first side of the head member and includes at least two leg members opposing each other to form an axial bore through the shank member in cooperative alignment with the aperture of the head member where at least one of the leg members is substantially flexible.

The drive pin has a predetermined length and cross-sectional configuration and first and second opposite ends for complementary alignment and engagement with the aperture and the axial bore and for outwardly flexing the flexible leg member upon insertion within the axial bore. A first engagement mechanism is provided for releasably retaining at least a portion of the first end of the drive pin within the shank member at a first driven position, for enabling outward flexing of the leg member and for releasably retaining the portion of the first end of the drive pin completely within the confines of the rivet body.

A second engagement mechanism is also provided for releasably retaining at least a portion of the first end of the drive pin within the shank member at a second release position for enabling collapse of the leg member after flexing and for releasably retaining the portion of the first end of the drive pin completely within the confines of the rivet body.

BRIEF DESCRIPTION OF THE DRAWINGS

Various other objects, features, and attendant advantages of the present invention will become better understood from the following detailed description, when considered in connection with the accompanying drawings in which like reference characters designate like or corresponding parts throughout the several views, and wherein:

FIG 1 is a side elevational view of the fastener of the invention illustrating the drive pin frangibly connected to the rivet body;

FIG. 2 is a top plan view of the fastener of FIG. 1 axially rotated ninety degrees to the right;

FIG. 3 is a side elevational view of the fastener of the invention as illustrated in FIG. 2;

FIG. 4 is a cross-sectional view of the fastener of the invention taken along lines 4—4 of FIG. 3 and in the direction indicated generally;

FIG. 5 is a cross-sectional view of the fastener of the invention taken along lines 5—5 of FIG. 3 and in the direction indicated generally;

FIG. 6 is a perspective view of the fastener of the invention in its pre-driven position just prior to insertion within apertures of two panels;

FIG. 7 is a side elevational view, in partial section, of the fastener of the invention in its driven or fastened position;

FIG. 8 is a side elevational view, in partial section, of the fastener of the invention with the drive pin inserted beyond its driven position of FIG. 7 illustrating the removal of the fastener from the panel apertures; and FIG. 9 is a side elevational view of the fastener of the invention removed from the panels and with the drive pin removed from the rivet body.

DESCRIPTION OF THE PREFERRED EMBODIMENT

Referring to FIG. 1, the rivet fastener of the invention is designated generally by the reference numeral 10. As FIGS. 6 and 7 illustrate, the fastener 10 can be utilized to connect two members, such as panels 12, through apertures 14 formed through the panels 12.

As FIG. 1 illustrates, the fastener 10 is initially molded in one-piece including two members, a rivet body 16 and a drive pin 18. Preferably, the drive pin 18 is frangibly connected to the rivet body 16 and both members are molded from plastic, but the particular material can vary.

The rivet body 16 includes a head member 20 and a shank member 22 which is integrally formed with a first back side of the head member 20. The head member 20 is substantially annular in configuration and is utilized to abut the outer one of the two panels 12 so as to prevent the rivet body 16 from extending through the apertures 14. The particular shape and thickness of the head member 20 can vary.

As FIG. 2 illustrates, the head member 20 includes a central aperture or slot 24 extending therethrough and having a predetermined configuration for cooperative engagement with the drive pin 18. Preferably, the slot 24 is substantially in the shape of the letter "S" so as to provide keyed engagement with the drive pin 18.

The shank member 22, as illustrated in FIG. 1, is preferably formed by first and second elongate substantially flexible leg members 26 and 28 each of which is integrally formed with and depend from the back side of the head member 20. It is to be understood that the number of legs can vary and one of the two legs 26 or 28 can be formed so as to be substantially rigid so that only one leg 26 or 28 is flexible.

To accept the drive pin 18 within the shank 22 the legs 26 and 28 are positioned at a distance from each other as illustrated in FIG. 3. Thus, an axial bore 30 is formed between the legs 26 and 28 so as to extend through the shank 22 and is substantially in alignment with the aperture 24 of the head member 20. As will be described below, the shape of the axial bore 30 roughly corresponds to the shape of the "S" shaped aperture 24 through the head 20.

Briefly, in use, as FIG. 6 illustrates, the drive pin 18 is initially inserted into the axial bore 30 of the rivet body 16 in the direction of arrow "A" to a pre-driven position for shipping and ease of installation. The shank 22 is then inserted into the apertures 14 of the panels 12 and, as FIG. 7 illustrates, the drive pin 18 is further inserted in the direction of arrow "A", such as with a hammer or other impact tool, to the driven position. In the driven position the legs 26 and 28 are flexed outward in the direction of arrows "B" so as to capture the fastener 10 behind the panels 12. To remove the fastener 10 from the panels 12, the drive pin 18 is further inserted within the rivet body 16 in the direction of arrow "A" to a removal position where the drive pin 18 is still held by and contained within the rivet body 16, as FIG. 8 illustrates. This enables the legs 26 and 28 to collapse and return to their original unflexed positions whereby the fastener 10 can be pulled out in a direction opposite arrow "A" and removed, thereby disconnecting the panels 12.

It is to be noted that in the pre-driven, driven and removal positions of the drive pin 18 within the rivet body 16 the drive pin 18 never protrudes or extends beyond the distal end of the shank 22 and the drive pin 18 is retained by a different retention mechanism. Thus, no additional clearance is necessary beyond the shank 22 to enable fastening and removal of the fastener 10. Additionally, the length of the shank 22 and drive pin 18 can be adjusted to accommodate a range of panel thicknesses and to reduce the distance that the shank 22 protrudes beyond the panel 12 when assembled.

As FIG. 3 illustrates, to assist in insertion of the legs 26 and 28 into the apertures 14 of the panels 12, each leg 26 and 28 can be rounded-off or tapered at a distal end 32. Additionally, to further assist in insertion, the distal ends 32 of the legs 26 and 28 can be connected (not illustrated) to form a "nose" which can substantially taper to a point or slightly blunt end.

As FIGS. 3-6 illustrate, each leg 26 and 28 is three-sided including a first flat interior surface 34, a second exterior arcuate surface 36 and a third flat exterior end surface 38. The flat interior surfaces 34 of each leg 26 and 28 face each other and are positioned at a distance from each other so as to form the axial bore 30 therebetween.

As FIGS. 4 and 5 illustrate, the axial bore 30 substantially is "S" shaped corresponding to the cross-sectional configuration of the drive pin 18. Thus, when the drive pin 18 is completely inserted within the axial bore 30 as FIG. 8 illustrates, the arcuate exterior surfaces 36 of the legs 26 and 28 combined with the exterior surfaces of the drive pin 18 make up an arcuate periphery of the shank 22 for the corresponding fit within the arcuate panel apertures 14.

To assist in gripping the back side of the lower panel 12 as illustrated in FIG. 7, the exterior arcuate surfaces 36 of each leg 26 and 28 can include a shoulder 40. The shoulder 40 also assists in holding the shank 22 within the apertures 14 prior to insertion of the drive pin 18.

As FIG. 3 illustrates, to retain the drive pin 18 at various positions within the axial bore 30, such as the pre-driven, driven and removal or release positions, the leg 26 includes a first rib 42 on its third flat end 38 and a second rib 44 on its first flat interior surface 34 which slightly protrudes into the axial bore 30. Similarly, the leg 28 includes a third rib 46 on its third flat end 38 and a fourth rib 48 on its first flat interior surface 34 which slightly protrudes into the axial bore 30.

The ribs 42-48 engage with corresponding portions of the drive pin 18 to provide detent retention positions as will be explained below. The first and second ribs 42 and 44 extend substantially perpendicular to each other and are separated a distance "X". The third and fourth ribs 46 and 48 likewise are substantially perpendicular to each other and are separated a distance "X" (not illustrated.)

Additionally, the third rib 46 is substantially the same size as the first rib 42 but is positioned closer to the head 20 than the first rib 42. The fourth rib 48 substantially is the same size as the second rib 44, both of which are slightly larger than the first and third ribs 42 and 46. The fourth rib 48 is also positioned closer to the head 20 than the second rib 44. Thus, the ribs 42-48 are staggered along the length of the shank 22 with the pair of ribs 46 and 48 on the second leg 28 being shifted toward the head 20 with respect to the pair of ribs 42 and 44 of the first leg 26.

As FIG. 1 illustrates, the drive pin 18 is elongate and includes a first distal or insertion end 50 and a second proximal or head end 52. Preferably, the drive pin 18 does not include a head, but can be provided with one if desired and the rivet body 16 can be modified to accommodate the head to achieve the pre-driven, driven and removal positions of the drive pin 18.

When viewed from the first end 50, as FIG. 4 illustrates, the drive pin 18 is substantially "S" shaped in cross-section. Conversely, when viewed from the second end 52, as in FIG. 2, the drive pin 18 is "Z" shaped in cross-section.

Thus, the drive pin 18 includes a central substantially rectangular body portion 54 defined by first and second opposite planar surfaces 56 and 58 and first and second opposite arcuate surfaces 60 and 62. Each surface 56, 58, 60 and 62 extends the length of the drive pin 18.

A first shoulder 64 is formed along the length of the first planar surface 56 proximate the first arcuate surface 60 and a second shoulder 66 is formed along the length of the second planar surface 58 proximate the second arcuate surface 62.

To maintain the drive pin 18 in the pre-driven position for shipping and ease of installation, as FIG. 6 illustrates, the first shoulder 64 includes a first recess or receiving channel 68 formed proximate the first end 50 of the drive pin 18. When in the pre-driven position, the first rib 42 of the first leg 26 seats within the first recess 68 to releasably retain the drive pin 18 in the pre-driven position.

Similarly, as FIG. 3 illustrates, the second shoulder 66 includes a second recess or receiving channel 70 formed proximate the first end 50 of the drive pin 18 for seating of the third rib 46 therein. Thus, when in the pre-driven position illustrated in FIG. 6, the drive pin 18 is held within the axial bore 30 by the cooperation of the first rib 42 and the first recess 68 as well as the third rib 46 and the second recess 70.

To increase or decrease the holding power provided by the ribs 42 and 46 and recess 68 and 70, or any other rib or recess, the size and shape of those members can be modified as desired. For example, the ribs 42 or 46 can be pointed or triangular for engagement within triangular shaped recesses 68 and 70 (not illustrated.) Additionally, to increase the holding power of the ribs and recesses the flexibility of the legs 26 and 28 can be decreased by changing the material or modifying the structure of the legs 26 and 28.

As FIG. 7 illustrates, to engage the second rib 44 of the first leg 26, the first planar side 56 of the drive pin 18 includes a first recess 72 and a second enlarged recess 74. Similarly, to engage the fourth rib 48 of the second leg 28, the second planar side 58 of the drive pin 18 includes a first recess 76 and a second enlarged recess 78. The first recesses 72 and 76 are utilized to provide the driven position of the drive pin 18 within the axial bore 30 while the second enlarged recesses 74 and 78 are utilized to form the release position of the drive pin 18 within the axial bore 30.

To engage the first leg 26 and flex it gradually outward in the direction of arrows "B" during insertion of the drive pin 18, the first planar side 56 of the drive pin 18 includes a first ramped surface 80 proximate the first end 50. Similarly, to engage the second leg 28 and flex it gradually outward in the direction of arrow "B" during insertion of the drive pin 18, the second planar side 58 of the drive pin 18 includes a second ramped surface 82 proximate the first end 50.

Outward flexing of the legs 26 and 28 is accomplished since the width of the drive pin 18 between the opposite planar surfaces 56 and 58 combines with the size of the ribs 44 and 48 seated within the first recesses 72 and 76 of the drive pin 18 to expand the legs 26 and 28 beyond the size of the apertures 14. When the drive pin 18 is advanced to its release position, illustrated in FIG. 8, the ribs 44 and 48 engage within the second larger recesses 74 and 78 of the drive pin 18 which enables the legs 26 and 28 to compress to a shape within the confines of the apertures 14 and enable removal of the fastener 10.

In use, the fastener 10 is molded as illustrated in FIGS. 1 and 3 with the first end 50 of the drive pin 18 frangibly connected to the head 20 of the rivet body 16. If desired, the fastener 10 can be shipped in this state and assembled as described.

Preferably, prior to shipping, the drive pin 18 is inserted into the axial bore 30 to the pre-driven position illustrated in FIG. 6. In this position, the first and third ribs 42 and 46 of the first and second legs 26 and 28 are releasably retained within the recesses 68 and 70 of the first and second shoulders 64 and 66, respectively, of the drive pin 18. The fastener 10 can then be shipped in the pre-driven position.

To assemble two panels 12, with the fastener in the pre-driven position the shank 22 of the rivet body 16 is inserted through the apertures 14 in the panels 12 until the shoulder 40 seats behind the lower one of the two panels 12. Next, the second end 52 of the drive pin 18 is hit with a hammer or the like to drive the drive pin 18 downward in the direction of arrow "A" until the second end 52 of the drive pin 18 is substantially flush with the head 20 as illustrated in FIG. 7. In this position, the second and fourth ribs 44 and 48 of the legs 26 and 28 are seated within the first recesses 72 and 76 of the drive pin 18 and the legs 26 and 28 are flexed outward to retain the fastener 10 and the panels 12.

To remove the fastener 10, as FIG. 8 illustrates, the second end 52 of the drive pin 18 is pushed, such as with a screw driver or other tool, further in the direction of arrow "A" to the release position. In this position, the second and fourth ribs 44 and 48 of the legs 26 and 28 are seated within the second larger recesses 74 and 78 of the drive pin 18 where the legs 26 and 28 are compressed or returned to their original positions within the confines of the apertures 14 whereby the fastener 10 can be removed from the panels 12.

After removal of the fastener 10 from the panels 12, a FIG. 9 illustrates, the drive pin 18 can be advanced further in the direction of arrow "A" so as to completely remove the drive pin 18 from the rivet body 16. When the fastener 10 is to be reinserted into the panels 12, such as after servicing, the drive pin 18 can be inserted back into the axial bore 30 to the pre-driven position and the fastener 10 reinstalled as described above.

Thus, the fastener 10 of the present invention provides a push-push rivet where the drive pin 18 never protrudes past the shank 22 when positioned in the pre-driven, driven or removal positions. The drive pin 18 remains centered in the rivet body 16 due to the shape of the drive pin 18 and axial bore 30. The mechanism that holds the drive pin 18 at the pre-drive depth is separate from the mechanism that holds the drive pin 18 at the removal depth and the shank 20 only has two legs 26 and 28 which makes it easier to collapse and install the shank 20. Additionally, the frangible connection eliminates collation of the drive pin 18 with the rivet body 16 prior to positioning of the drive pin 18 therein.

Modifications and variations of the present invention are possible in light of the above teachings. It is therefor to be understood that within the scope of the appended claims, the invention may be practiced otherwise than as specifically described.

What is claimed and desired to be secured by Letters Patent is:

1. A rivet fastener for securing two panels together in butt contact along first respective surfaces thereof, comprising:

a body portion having a head member for engaging a second surface of a first one of said two panels; and a shank member, integrally formed with a first back side of said head member, for insertion within apertures defined within said two panels, said head member including an aperture defined therethrough and having a predetermined configuration, and said shank member extending axially a predetermined distance away from said first back side of said head member and including at least two leg members opposed to each other so as to form an axial bore through said shank member in cooperative alignment with said aperture of said head member, at least one of said at least two leg members being substantially flexible;

a drive pin, having a predetermined length, a predetermined cross-sectional configuration, and first and second opposite ends, for complementary alignment and engagement with said aperture of said head member and said axial bore of said shank member and for outwardly flexing said at least one flexible leg member upon insertion of said first end of said drive pin within said axial bore of said shank member;

first engagement means defined between said shank member and said drive pin for releasably retaining said first end of said drive pin within said shank member at a first, axial, driven position at which said first end of said drive pin causes outward flexing of said at least one flexible leg member such that said outwardly flexed flexible leg member can retainably engage a second surface of a second one of said two panels so as to cooperate with said head member in securing said two panels together, said first end of said drive pin being disposed completely within the confines of said rivet body portion when said drive pin is disposed at said first, axial, driven position; and second engagement means defined between said shank member and said drive pin for releasably retaining said first end of said drive pin within said shank member at a second, axial, release position, disposed axially further away from said head member than said first, axial, driven position, at which said first end of said drive pin permits said outwardly flexed flexible leg member to collapse inwardly from said outwardly flexed position such that said body portion and said drive pin can be removed from said apertures of said two panels, said first end of said drive pin being disposed completely within the confines of said rivet body portion when said drive pin is disposed at said second release position.

2. The rivet fastener as defined in claim 1 including third engagement means for releasably retaining said first end of said drive pin within said rivet body portion at a third, ascial, pre-driven position.

3. The rivet fastener as defined in claim 2 wherein said third engagement means retain said first end of said drive pin within the shank member of said rivet body portion without providing outward flexing of said leg member.

4. The rivet fastener as defined in claim 2 wherein said first end of said drive pin is frangibly connected to said head member of said rivet body portion.

5. The rivet fastener as defined in claim 1 wherein both said first and second engagement means further provide for retaining the entire drive pin completely within the confines of the rivet body portion.

6. The rivet fastener as defined in claim 1 wherein both said first and second engagement means are provided by a plurality of cooperative ribs and channels formed on respective portions of said drive pin and said leg members.

7. The rivet fastener as defined in claim 6 wherein said ribs and channels can be formed to vary the retention of said drive pin with respect to said leg members.

8. The rivet fastener as defined in claim 1 wherein said shank member includes two substantially flexible leg members and said drive pin outwardly flexes both of said leg members.

9. A rivet fastener as set forth in claim 1, wherein:
said rivet fastener, comprising said body portion and said drive pin, comprises a one-piece fastener molded from a plastic material.

10. A rivet fastener as set forth in claim 1, wherein:
said aperture of said head member has a substantially Z-shaped configuration; and
said drive pin has a substantially Z-shaped configuration as seen in cross-section.

11. A rivet fastener as set forth in claim 1, wherein:
each one of said two leg members of said shank member comprises a first flat interior surface disposed opposite to a corresponding first flat interior surface of the other one of said two leg members so as to define said axial bore therebetween, a second exterior arcuate surface, and a third flat exterior end surface disposed substantially perpendicular to said first flat interior surface.

12. A rivet fastener as set forth in claim 11, wherein:
said drive pin comprises oppositely disposed exterior arcuate surfaces corresponding to said second exterior arcuate surfaces of said two leg members of said shank member such that when said drive pin is inserted within said axial bore of said shank member so as to be disposed at said first, axial, driven position, said arcuate surfaces of said drive pin and said leg members of said shank members cooperate with each other so as to define an arcuate periphery for said rivet fastener which cooperates with arcuate wall portions defining said apertures within said two panels being connected together.

13. A rivet fastener as set forth in claim 11, wherein:
said second arcuate surfaces of said leg members of said shank member are provided with peripherally extending shoulder means for engaging said second surface of said second one of said two panels being secured together so as to enhance the fastening of said two panels together by said rivet fastener.

14. A rivet fastener as set forth in claim 11, wherein:
said first engagement means for releasably retaining said drive pin at said first driven position comprises a rib formed upon each one of said first flat interior surfaces of said two leg members, and a first recess formed within each one of oppositely disposed sides of said drive pin for receiving said ribs of said leg members; and said second engagement means for releasably retaining said drive pin at said second release position comprises a second recess formed within each one of said oppositely disposed sides of said drive pin for receiving said ribs of said leg members, said second recesses of said drive pin being larger than said first recesses of said drive pin.

15. A rivet fastener as set forth in claim 14, wherein:
said first recesses of said drive pin are axially offset with respect to each other along the axial extent of said drive pin; and
said second recesses of said drive pin are axially offset with respect to each other along said axial extent of said drive pin.

16. A rivet fastener as set forth in claim 11, further comprising:

third engagement means, for releasably retaining said first end of said drive pin at a pre-driven position within said shank member at a third, axial location defined closest to said head member, comprising a rib formed upon each one of said third flat exterior end surfaces of said leg members, and a recess formed within each one of oppositely disposed ends of said drive pin for receiving said ribs of said leg members.

17. A rivet fastener as set forth in claim 14, wherein:
said oppositely disposed sides of said drive pin include ramp means for engaging said ribs of said leg members as said drive pin is moved toward said driven position so as to facilitate said outward flexing of said at least one flexible leg member.

* * * * *